Patented Feb. 2, 1937

2,069,545

UNITED STATES PATENT OFFICE 2,069,545

SYNTHESIS OF HYDROCYANIC ACID

Paul Johnson Carlisle and Alexander Douglas Macallum, Niagara Falls, N. Y., assignors to E. I. du Pont de Nemours & Company, Wilmington, Del., a corporation of Delaware No Drawing. Application June 9, 1933, Serial No. 675,106

12 Claims. (Cl. 23—151)

This invention relates to the synthesis of hydrocyanic acid from ammonia and hydrocarbon.

A large number of processes for synthesizing hydrocyanic acid from ammonia have been heretofore proposed. These methods have comprised reacting ammonia at high temperatures, with or without a catalyst, with carbon or hydrocarbon. In some processes other gases such as nitrogen or hydrogen are also mixed with the ammonia undergoing reaction.

These processes have not been commercially practical because of the difficulty of heat input. The reaction between ammonia and a carbonaceous material to form hydrocyanic acid is endothermic and, in order to produce useful yields of hydrocyanic acid, it must be carried out at high temperatures, e. g., at least 1000° C. and preferably around 1200 to 1400° C. Also because of the relative instability of ammonia at high temperatures, the reaction gases must be passed through the zone of high temperature at a rapid rate. These conditions require that the reaction apparatus be made of refractory material and further that the rate of heat input be high. To meet these requirements in an externally heated system for large-scale production, a multitubular apparatus is required, the tubes being made of refractory material and of small diameter. Such apparatus is expensive and complicated and is not economically practical for large scale work.

A number of processes have been proposed involving the use of a reaction catalyst. In general, the use of a catalyst results in lowering of the reaction temperature to some extent. However, there are serious objections to the use of a catalyst; for example, the susceptibility of suitable catalysts to "poisoning" requires that the reactant gases must be previously purified to remove catalyst poisons. Also, secondary reactions depositing films of carbon, occur to some extent in the synthesis of HCN from ammonia and gaseous carbon compounds at high temperatures which causes fouling of catalyst bodies used for the reaction. For these reasons, it is preferable to employ a process using no catalysts, since thereby, expensive purification processes are avoided, and relatively cheap grades of hydrocarbon, for instance natural gas, may be used.

The object of this invention is to provide a substantially non-catalytic free space reaction process for reacting ammonia with hydrocarbons to produce HCN. A further object is to provide such a process in which external heating of the reacting gases and/or the reaction chamber is avoided or reduced to a minimum.

These objects are attained according to our invention by supplying part of the heat required for the endothermic reaction between ammonia and hydrocarbon by preheating the reaction gases and supplying the remainder by reacting an excess of hydrocarbon with oxygen simultaneously and in the same reaction space with the reaction between ammonia and hydrocarbon. Preferably, the amount of hydrocarbon used is in excess of the total amount theoretically required to react with the ammonia and the oxygen present.

In order to react ammonia with hydrocarbon to obtain practical yields of hydrocyanic acid according to our invention, it is necessary to proportion the reacting gases as described below and to take care to conserve the heat produced by the oxidation of the excess hydrocarbon. A priori, it would seem that a large excess of the heat required for the endothermic reaction between ammonia and hydrocarbon could be produced by merely mixing a sufficiently large excess of hydrocarbon with the ammonia and adding sufficient oxygen to react with the excess hydrocarbon. We have found that this is not practicable, because when the ratio of hydrocarbon to ammonia is increased beyond a certain point, the additional available heat formed is considerably less than would be expected, although sufficient oxygen may be present to burn substantially all the excess hydrocarbon to carbon monoxide and water. This unexpected result is due to an endothermic secondary reaction between water and hydrocarbon. An increase in the total gas volume is also disadvantageous in that it further decreases the concentration of hydrocyanic acid in the off-gas, making recovery more difficult. Furthermore, when one attempts to obtain a large excess of heat by increasing the amounts of hydrocarbon and using air instead of oxygen, so much diluent gas is added that the actual temperature rise is relatively small because of the heat capacity of the added nitrogen.

We have further discovered that maximum yields of HCN are favored if the amount of hydrocarbon present in a reaction mixture comprising ammonia, hydrocarbon and oxygen is substantially in excess of that theoretically required to react with both the ammonia and the oxygen. However, this excess must not be too great; otherwise carbon deposition is likely to occur. More specifically, we have found that when ammonia is reacted with methane at 1000–1400° C. in the presence of air, the optimum ratio of methane to ammonia is about 4 to 1 by volume. When ammonia and methane in this ratio are reacted in the presence of air in an amount theoretically sufficient to burn about half of the total methane, the most satisfactory results are obtained. This optimum ratio may vary under different conditions than those we have employed, or when using different hydrocarbons. Furthermore, the hydrocarbon-ammonia ratio may be varied outside of the optimum point over a certain range, without greatly lowering the yield of hydrocyanic acid. We prefer to have present at least two and not more than five volumes of methane or its stoichiometrical equivalent, to one volume of ammonia. The amount of oxygen used should be sufficient to burn around one-half of the excess hydrocarbon; preferably, it should not substantially exceed the amount required to burn all the excess hydrocarbon.

The reactions which probably occur when methane is reacted may be represented as follows:

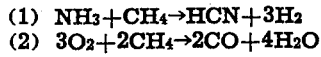

(1) $NH_3 + CH_4 \rightarrow HCN + 3H_2$
(2) $3O_2 + 2CH_4 \rightarrow 2CO + 4H_2O$ Hence, when a mixture of 1 volume of ammonia, 3 volumes of oxygen (or the equivalent volume of air) and 4 volumes of methane is reacted in accordance with our invention, there is 1 volume of methane in excess of that theoretically required to react with the ammonia and the oxygen. Throughout this specification and in the appended claims, expressions relating to the theoretical quantities of hydrocarbon required to react with ammonia and oxygen refer to the theory expressed by the above equations. Obviously similar equations may be written to express the reaction of hydrocarbons other than methane; general equations may be formulated as follows:

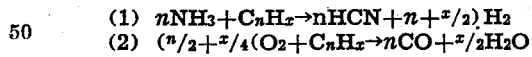

(1) $nNH_3 + C_nH_x \rightarrow nHCN + n + x/2)H_2$
(2) $(n/2 + x/4)O_2 + C_nH_x \rightarrow nCO + x/2 H_2O$ The theory expressed by the equations given above is used primarily as a means of determining the amount of hydrocarbon to be used in practicing our invention; we have not determined whether these equations completely explain the chemistry of the process. In fact, we believe that other reactions do occur; for example, some of the excess hydrocarbon may react with the water formed and some of the hydrogen and/or carbon monoxide produced may be oxidized. It is necessary to preheat the reaction mixture in orer to initiate the reaction. We have found that practical yields of hydrocyanic acid are obtained by employing reaction temperatures of the order of 1000° C. or higher; to attain these temperatures it is necessary to preheat the reaction gases to around 400° C. or higher, depending on the hydrocarbon used. Moreover, the minimum preheating temperature is an ignition temperature, that is, the temperature at which the hydrocarbon will start to react, and react rapidly, with the oxygen in the particular gas mixture in use. This ignition temperature obviously will vary for different hydrocarbons and is higher for methane than for unsaturated hydrocarbons such as ethylene. Preferably, using methane, we preheat the gases to 600–1000° C. and attain a reaction temperature of 1300–1400° C. The preheating may be accomplished in any suitable manner, for instance by passing the gases through an electric furnace or by heat exchange with flue gas from a combustion furnace. We prefer to heat the incoming gases by passing them in heat exchange relationship to the reaction off-gas. Since the preheating temperature is sufficiently low to permit at least part of the heat exchange to take place in a metal apparatus, efficient heat transfer during the preheating is possible and the entire process thus may be carried out with substantially no external heating; in this manner the total heat required for the reaction of the ammonia with the hydrocarbon is obtained by exothermic reactions occurring in the reaction chamber.

In brief, our invention may be described as a process for carrying out the endothermic reaction between ammonia and hydrocarbon to form hydrocyanic acid, characterized by the fact that the heat required for the endothermic reaction is obtained by concurrent exothermic reaction or reactions occurring within the same reaction space. Sufficient heat may be furnished by this means to supply part or all of the total heat requirements of the entire system. These heat requirements obviously are:

1. Heat required for the endothermic reaction between ammonia and hydrocarbon and other endothermic reactions.
2. Heat required to raise reactant gases and inert gases to the reaction temperature.
3. Heat required to compensate for radiation and other heat losses.

If less than the total heat requirement is supplied by the exothermic reactions, the remainder may be supplied by additionally preheating the incoming gases by some other means.

By way of explanation, we have described the aforesaid exothermic reactions as oxidation of the excess hydrocarbon. However, the invention is not to be restricted by this explanation, since it is possible that one or more other oxidations may occur; e. g., combustion of hydrogen, carbon or carbon monoxide. Hence, in this specification and in the appended claims, when we mention oxidation of hydrocarbon, we mean to include other oxidation reactions which may occur.

In one method of carrying out our invention, a mixture of one volume of ammonia, two to five volumes of methane, and five to fifteen volumes of air, are preheated to 600 to 1000° C. and then passed into a refractory reaction chamber. The over-all reaction which there occurs is sufficiently exothermic to bring the reaction temperature up to 1000 to 1400° C. or higher, depending upon the amounts of hydrocarbon and oxygen in the mixture. The reaction temperature may be varied by properly adjusting the amount of oxygen or air, and hydrocarbon which are allowed to flow through the reaction chamber. In place of methane, other hydrocarbons, for example, natural gas, ethylene, propane or butane may be used in stoichiometrically equivalent amounts. By a stoichiometrically equivalent amount we mean an amount which will furnish the same amount of carbon; for instance, one volume of either ethane or ethylene is stoichiometrically equivalent to two volumes of methane.

The velocity with which the gases are passed through the reaction chamber may be varied over a considerable range. In order to define this velocity, we prefer to use the term "space velocity per hour", abbreviated as "S. V. H.", by which we mean the number of volumes of the total gas mixture, calculated to normal temperature and pressure, per volume of the reaction space, which pass through the reaction space in one hour. In our process, the space velocity per hour may vary from 300 to 5,000 S. V. H. and the reaction temperature may vary between 1000 and 1400° C. with good results. We prefer to operate the process at around 1300 to 1400° C., using a space velocity of about 4000 S. V. H., and to employ a reaction mixture containing about four volumes of methane or its equivalent in other hydrocarbons, and about three volumes of oxygen or its equivalent in air to one volume of ammonia. It is not necessary to work at pressures higher than around 1 atmosphere, although higher or lower pressures may be used if desired.

Another method of practicing our invention comprises burning hydrocarbon, carbon or other carbonaceous combustible material with air or oxygen, to produce a flue gas having a temperature of from 400 to 1000° C. and introducing into this hot gas stream a mixture of ammonia with an excess of hydrocarbon and sufficient air or oxygen to burn part or all of the excess hydrocarbon. In this 2-stage method, the proportion of hydrocarbon to ammonia in the mixture introduced into the flue gas stream, need not be as high as in the single-stage method described above, but may be varied depending on the temperature of the combustion gas and the desired reaction temperature. If hydrocarbon is burned in the first stage, the ratio of the ammonia to the total hydrocarbon used in both stages will be approximately the same as in the above described single stage process.

Example I

A mixture containing one volume of ammonia, four volumes of methane, and fifteen volumes of air at atmospheric pressure and a temperature of about 20° C. was passed through a silica tube heated in an electrical furnace at a rate of flow equivalent to about 64 liters of gas per hour at 0° C. and 1 atmosphere pressure. The internal diameter of the tube was approximately 16 millimeters.

Temperature measurements taken at various points in the silica tube showed that the temperature progressively increased from near room temperature at the inlet to a temperature of about 1400° C. near the center of the tube. This temperature of 1400° C. existed over a length of the tube equal to about 8 centimeters, which corresponds to a volume of about 16 cc. Beyond this zone of high temperature, the temperature decreased somewhat due to cooling. Hence, this zone of high temperature functioned as the reaction space; the length of the tube preceding it functioned as a preheating space; the gases passed through this reaction space at a S. V. H. of 4,000. Hydrocyanic acid was removed from the off-gas by scrubbing with an alkaline solution, and the remaining gases were analyzed to determine the ammonia content. It was found that 31.7% of the ammonia passed through the tube unreacted. Of the remainder of the ammonia, 83.7% was reacted to form hydrocyanic acid, corresponding to a 57.2% conversion to hydrocyanic acid of the ammonia introduced in the original mixture.

Example II

A mixture of ammonia, natural gas, air, and additional free oxygen was passed through apparatus similar to that described in Example I, having a silica reaction tube of 49 mm. internal diameter. The rates of flow and volumetric ratios of the separate gas constituents passing into the apparatus were as follows:

| Gas | Rate of flow | Volumetric ratio |
| --- | --- | --- |
| | Cc. per min. | |
| Ammonia | 354 | 1.0 |
| Natural gas | 1600 | 4.5 |
| Air | 3000 | 8.4 |
| Oxygen | 600 | 1.7 |
| Total oxygen | | 3.3 |

The reaction temperature was maintained at about 1300° C. and the effective reaction space was about 8 cm. in length, corresponding to a reaction space volume of about 150 cc.

In this operation, 58.4% of the ammonia was reacted, and 87% of the reacted ammonia formed hydrocyanic acid.

As shown by the above examples, our process results in a high conversion of ammonia to hydrocyanic acid, with little loss by side reactions, e. g., decomposition to nitrogen and hydrogen. The unreacted ammonia may be recovered and recycled through the system.

An advantage of our process is that it enables high yields of hydrocyanic acid to be made by reacting ammonia and hydrocarbon in a non-catalytic, free space reaction at high temperatures in a refractory apparatus without the necessity of strong external heating. This is because in our process a large portion of the heat required for the endothermic reaction between the ammonia and hydrocarbon is produced inside the reaction space rather than outside. Hence, it results in a better utilization of heat and in higher yields than have been obtainable heretofore in non-catalytic reactions of ammonia with hydrocarbons. Furthermore, it is probable that the excess hydrocarbon used has a mass-action effect which aids in increasing the amount of ammonia converted to hydrocyanic acid. A further advantage is that a catalyst is not required; hence the reactants do not need to be highly purified to avoid the presence of catalyst poisons. This enables the use of the relatively inexpensive, impure forms of hydrocarbons, for instance, natural gas or other industrial hydrocarbon gases.

We claim:

1. A process for producing hydrocyanic acid comprising preheating a mixture comprising one volume of ammonia, a quantity of a hydrocarbon stoichiometrically equivalent to two to five volumes of methane and a quantity of oxygen equal to that required to oxidize 50 to 100% of the hydrocarbon which is in excess of the equivalent of one volume of methane, to carbon monoxide and water by external heating to at least the ignition temperature of said hydrocarbon and passing the preheated mixture through an unpacked reaction space at around 1500° C.

2. A process for producing hydrocyanic acid comprising preheating a mixture comprising one volume of ammonia, hydrocarbon equivalent to two to five volumes of methane and a quantity of oxygen equal to that required to oxidize about 50 to 100% of the hydrocarbon in excess of the equivalent of one volume of methane to carbon monoxide and water by external heating to at least the ignition temperature of said hydrocarbon and passing the preheated mixture through an unpacked reaction space at a temperature of 1000 to 1500° C.

3. A process for producing hydrocyanic acid comprising preheating a mixture comprising one volume of ammonia, two to five volumes of methane and a quantity of oxygen equal to that required to oxidize about 50 to 100% of the methane in excess of one volume to carbon monoxide and water by external heating to at least the ignition temperature of methane and passing the preheated mixture through an unpacked reaction space at a temperature around 1400° C.

4. A process for producing hydrocyanic acid comprising preheating a mixture comprising one volume of ammonia, two to five volumes of methane and a quantity of oxygen equal to that required to oxidize about 50 to 100% of the methane in excess of one volume to carbon monoxide and water by external heating to at least the ignition temperature of methane and passing the preheated mixture through an unpacked reaction space at a temperature around 1400° C., the aforesaid mixture being preheated solely by heat exchange with the reaction off-gases.

5. A process for reacting ammonia with a hydrocarbon to form hydrocyanic acid comprising mixing ammonia with a quantity of said hydrocarbon equivalent to at least twice the amount required to react with said ammonia together with a quantity of oxygen equal to that required to oxidize about 50 to 100% of the excess hydrocarbon to carbon monoxide and water, preheating the mixture to at least the ignition temperature of said hydrocarbon and passing the preheated mixture through an unpacked reaction space.

6. A process for producing hydrocyanic acid comprising preheating a gaseous mixture comprising ammonia, a quantity of hydrocarbon equivalent to at least twice that required to react with the ammonia and a quantity of oxygen equal to that required to oxidize about 50 to 100% of the excess of hydrocarbon to carbon monoxide and water by external heating to at least the ignition temperature of said hydrocarbon and passing said preheated mixture through an unpacked reaction space at a temperature not lower than about 1000° C.

7. A process for producing hydrocyanic acid comprising preheating a gaseous mixture comprising ammonia, a quantity of hydrocarbon equivalent to at least twice that required to react with the ammonia and a quantity of oxygen equal to that required to oxidize about 50 to 100% of the excess of hydrocarbon to carbon monoxide and water by external heating to at least the ignition temperature of said hydrocarbon and passing said preheated mixture through an unpacked reaction space at a temperature of not less than about 1300° C.

8. A process for producing hydrocyanic acid comprising preheating a gaseous mixture of one volume of ammonia, a volume of hydrocarbon stoichiometrically equivalent to at least two volumes of methane and a quantity of oxygen equal to that required to oxidize 50 to 100% of the hydrocarbon in excess of the equivalent of one volume of methane to carbon monoxide and water by external heating to at least the ignition temperature of said hydrocarbon and passing the preheated mixture through an unpacked reaction space at a temperature of 1000 to 1400° C.

9. A process for producing hydrocyanic acid comprising preheating a mixture of one volume of ammonia, two to five volumes of methane and a quantity of oxygen equal to that required to oxidize 50 to 100% of the methane in excess of one volume to carbon monoxide and water by external heating to at least the ignition temperature of said methane and passing the preheated mixture through an unpacked reaction space at a temperature of not less than about 1300° C.

10. A process for the production of hydrocyanic acid comprising burning carbonaceous material with an oxygen containing gas to produce a hot gas stream, and introducing into said gas stream a mixture containing ammonia, hydrocarbon and oxygen in such manner that the mixture obtained initially contains for each volume of ammonia, at least two volumes of hydrocarbon and a volume of oxygen equal to that required to oxidize about 50 to 100% of the hydrocarbon in excess of one volume to carbon monoxide and water, the temperature of said hot gas stream being such that the temperature of the resultant mixture is not lower than the ignition temperature of said hydrocarbon; and passing said resultant mixture through an unpacked reaction space at a temperature of 1000 to 1500° C.

11. A process for the production of hydrocyanic acid comprising continuously burning a hydrocarbon to obtain a hot gaseous combustion product, introducing into said combustion product a mixture containing ammonia, hydrocarbon and oxygen in such proportions that the resulting mixture initially contains for each volume of ammonia at least two volumes of hydrocarbon and a quantity of oxygen equal to that required to oxidize at least about one-half of the hydrocarbon in excess of one volume but not more than that required to oxidize all of such excess hydrocarbon to carbon monoxide and water, the temperature of said combustion product being such that the temperature of the resulting mixture is not lower than the ignition temperature of said hydrocarbon; and passing said resultant mixture through an unpacked reaction space at a temperature not lower than about 1300° C.

12. A process for the production of hydrocyanic acid comprising continuously burning methane to obtain a hot gaseous combustion product, and introducing into said combustion product a mixture containing ammonia, methane and oxygen in such proportions that for each volume of ammonia added, the total amount of methane used is 2 to 5 volumes, and the total volume of oxygen used is 50 to 100% of that required to oxidize said total amount of methane in excess of one volume to carbon monoxide and water, the temperature of said combustion product being such that the temperature of the resultant mixture is not lower than the ignition temperature of methane, and passing said resultant mixture through an unpacked reaction space at a temperature of about 1300 to 1400° C.

PAUL JOHNSON CARLISLE.
ALEXANDER DOUGLAS MACALLUM.